Sept. 25, 1923.  T. A. W. McCURDY  1,469,095
TIRE PUMP OPERATING MEANS AND RUNNING BOARD CONNECTING MEANS
Filed Nov. 10, 1922    2 Sheets-Sheet 1
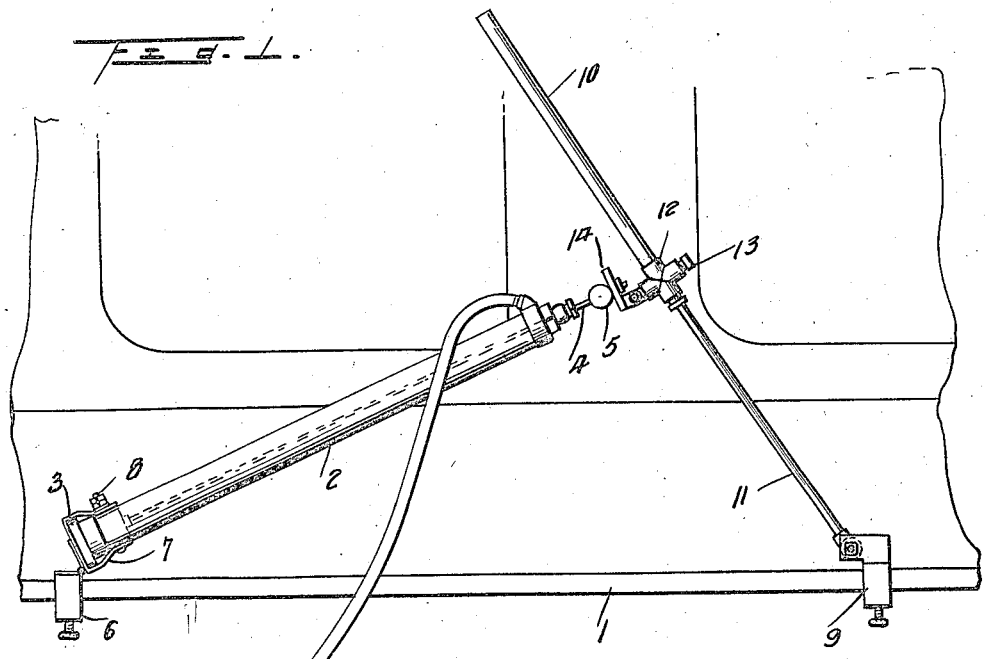
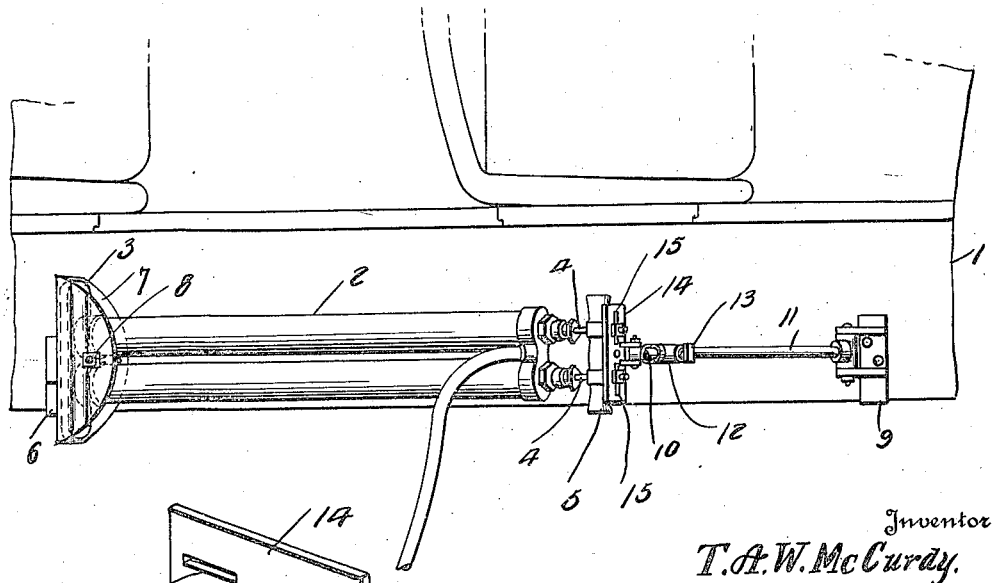
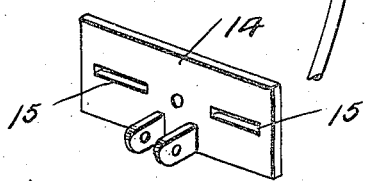
Inventor
T. A. W. McCurdy.

Sept. 25, 1923.                                                1,469,095
                    T. A. W. McCURDY
     TIRE PUMP OPERATING MEANS AND RUNNING BOARD CONNECTING MEANS
                  Filed Nov. 10, 1922      2 Sheets-Sheet 2
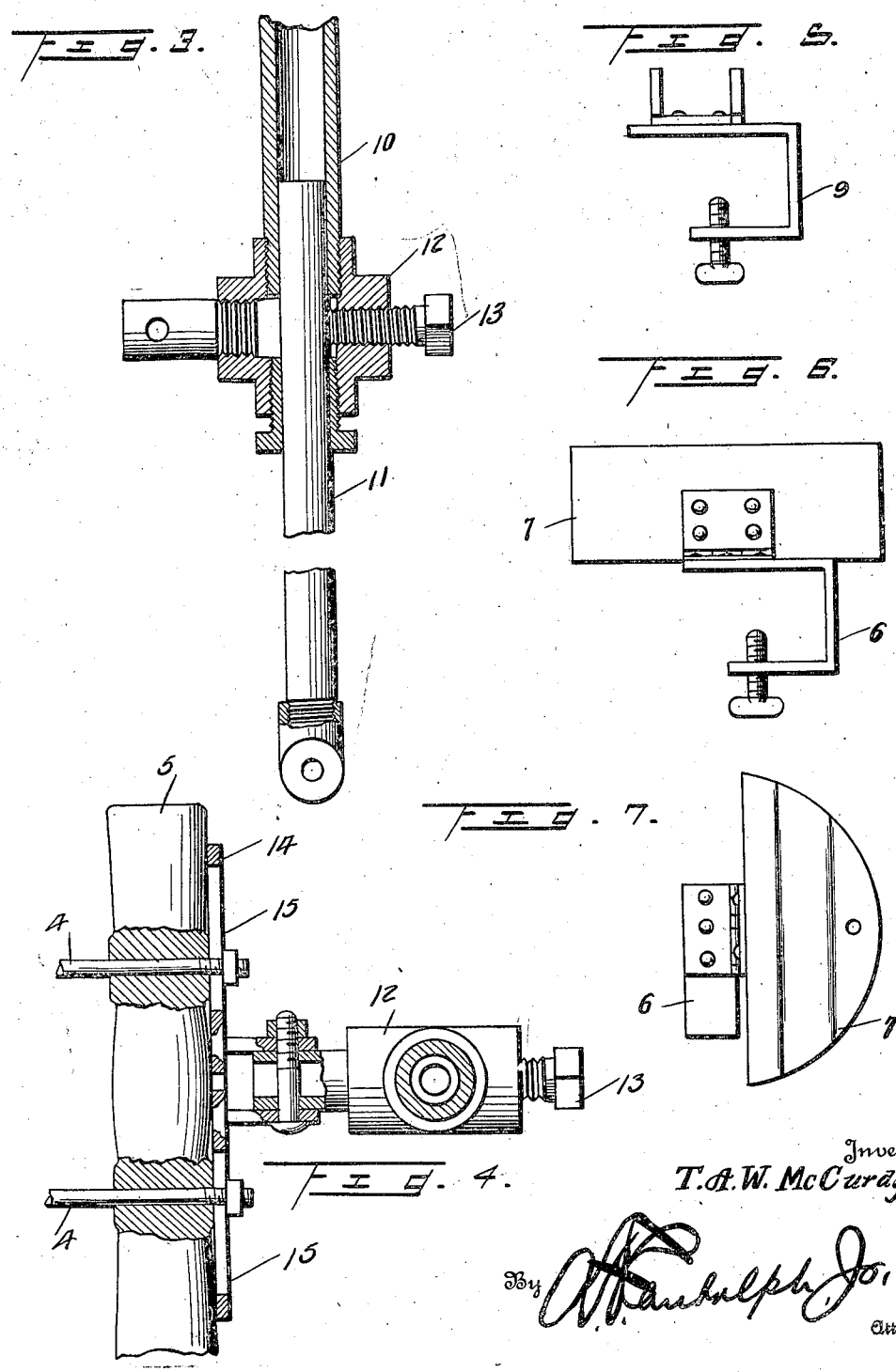

Patented Sept. 25, 1923.

1,469,095

UNITED STATES PATENT OFFICE.

THOMAS A. W. McCURDY, OF CLARK, SOUTH DAKOTA.

TIRE-PUMP-OPERATING MEANS AND RUNNING-BOARD-CONNECTING MEANS.

Application filed November 10, 1922. Serial No. 600,130.

*To all whom it may concern:*

Be it known that I, THOMAS A. W. MC-CURDY, a citizen of the United States, residing at Clark, in the county of Clark and State of South Dakota, have invented certain new and useful Improvements in Tire-Pump - Operating Means and Running-Board-Connecting Means; and I do hereby declare the following to be a full, clear, and exact description of the invention, such as will enable others skilled in the art to which it appertains to make and use the same.

This invention relates to operating means for any make, style or nature of tire pump and connecting means whereby the same may be attached to the running board of an automobile or analogous motor vehicle to the end that said pump may be easily, conveniently and effectively operated when required to inflate a tire, thereby obviating the objectionable features incident to the ordinary manner of operating a tire pump when inflating a tire.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is an elevation illustrative of the invention,

Figure 2 is a top plan view,

Figure 3 is a sectional detail of a portion of the telescoping lever,

Figure 4 is a detail view of the means whereby the lever is coupled to the handle of an air pump, Figure 5 is a detail view of the means whereby the handle is attached to the running board of a motor vehicle, Figure 6 is a front view of the means whereby the pump barrel is attached to the running board, Figure 7 is a top plan view of the parts shown in Figure 6, and Figure 8 is a detail perspective view of the plate forming the connecting means between the handle of the pump and the telescoping pump operating lever.

Corresponding and like parts are referred to in the following description and designated in the several views of the drawings by like reference characters.

The numeral 1 designates the running board of an automobile or other type of motor vehicle equipped with pneumatic tires. The pump which may comprise one or more cylinders may be of any construction, design or make such as usually provided as an accessory to an automobile tool knit. The pump illustrated is of the well known double acting type and is designated generally by the numeral 2. The pump 2 is adapted to be attached to the running board 1 by means of its foot 3. The piston rods 4 are connected by the handle 5. These parts may be of any ordinary construction and arrangement and are selected to demonstrate the application of the invention.

A clamp 6 has a clip 7 pivotally or hingedly connected thereto and said clip is adapted to receive the foot 3 of the pump to which it is attached in any manner, as by means of a bolt 8. The clamp 6 provides means for attaching the pump barrel to the running board in a manner to admit of pivotal movement of the pump when in operation.

A clamp 9 similar in construction to the clamp 6 provides means for pivotally connecting the operating lever to the running board, said clamp having the lever pivoted thereto. The lever comprises complemental members 10 and 11 having a telescopic arrangement whereby to admit of reducing the length of the lever so as to be conveniently stored when not required for service. A fitting 12 coupled to the lower end of the member 10 is provided with a clamp screw 13 whereby to secure the member 11 when extended into operative position. A plate 14 is pivotally connected to the fitting 12 and is adapted to have the handle 5 attached thereto, said plate being provided with openings 15 to receive the piston rod whether comprising one or more elements according to the nature of the pump.

A tire pump operating lever and running board connections embodying the invention may be conveniently carried as adjuncts of a tool kit for a motor vehicle and when it is required to inflate a tire, the pump may be readily mounted upon the running board and the lever extended to the required point to admit of the pump being operated with ease and without producing fatigue. The toggle movement incident to the disposition of the parts enables a great leverage to be brought into play in the operation of the pump and as a result, the operator is not overheated on a warm day and does not experience fatigue or overexertion which are objectionable features experienced in the operation of a tire pump in the ordinary manner.

What is claimed is:

1. In combination with a tire pump, an operating lever therefor comprising members having a telescopic arrangement, a fitting coupled to one of the members, means carried by the fitting and adapted to secure the telescoping member in adjusted position, and a plate pivoted to said fitting and adapted to have the handle of the pump connected thereto.

2. In combination with a tire pump, and a telescoping operating lever therefor, clamps adapted to be secured to the running board and having the pump and operating lever pivoted thereto, a fitting attached to one member of the operating lever and having the other member adjustably connected thereto, and a plate having pivotal connection with said fitting and adapted to have the pump rod connected thereto.

In testimony whereof I affix my signature in presence of two witnesses.

THOMAS A. W. McCURDY.

Witnesses:
A. W. COLLIER,
CARTER J. HUBER.